W. D. DORSEY.
Dumping Wagon.
No. 110,216.
Patented Dec. 20, 1870.
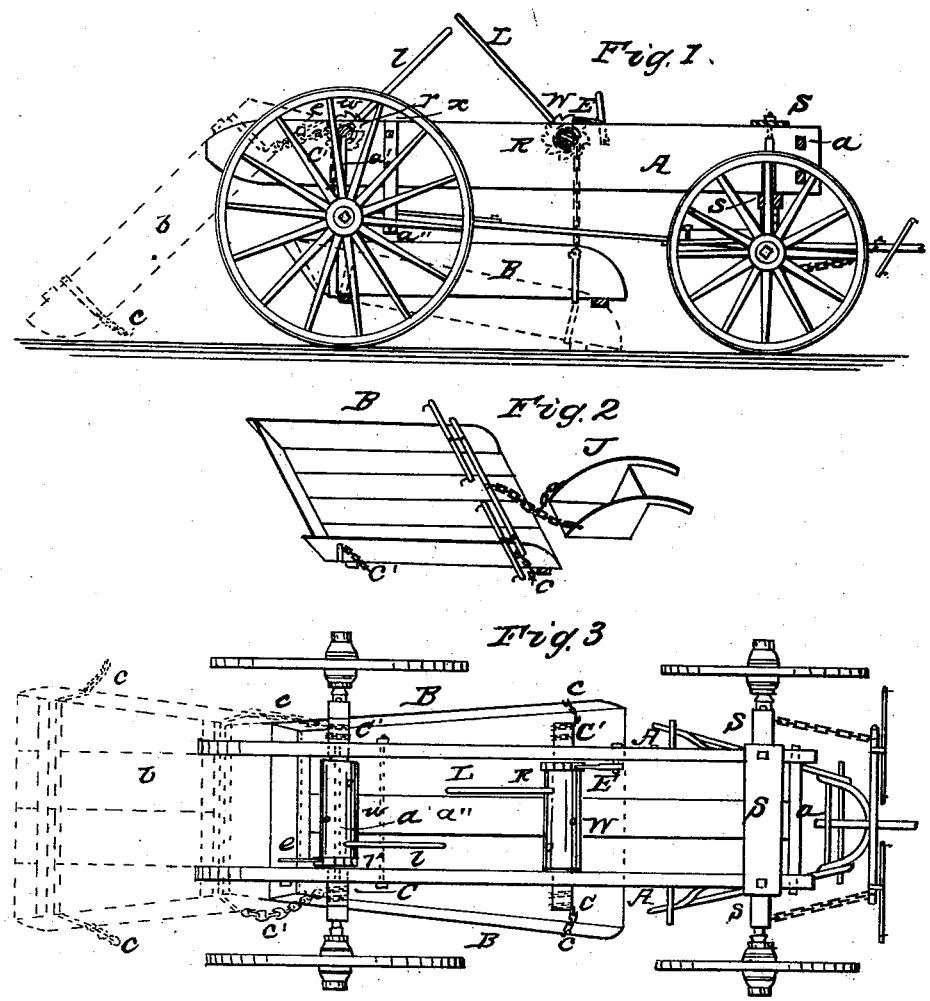

United States Patent Office.

WILLIAM D. DORSEY, OF DECATUR, ILLINOIS.

Letters Patent No. 110,216, dated December 20, 1870.

IMPROVEMENT IN PORTABLE LOADING AND DUMPING-MACHINES.

The Schedule referred to in these Letters Patent and making part of the same.

I, WILLIAM D. DORSEY, of Decatur, in the county of Macon and State of Illinois, have invented certain Improvements in Portable Loading and Dumping-Machines, of which the following is a specification.

Nature and Objects of the Invention.

My invention relates to a machine for loading and dumping earth, to do the work rapidly, and to lessen hand-labor for that purpose, the frame or body being placed upon any farm-wagon.

Description of the Accompanying Drawing.

Figure 1 is a side elevation of a machine embodying my invention.

Figure 2 is a perspective view of the box B, showing the manner of filling it.

Figure 3 is a plan of fig. 1.

General Description.

A is the frame or body of the machine, which can be placed upon any farm-wagon.

The frame should be substantially constructed. It is braced with a cross-piece of timber, as shown at $a$, secured by tenon and mortise.

S and $s$ are two pieces of timber, bolted to the frame A, the upper piece S serving as a seat for the driver, the lower piece resting on the bolster.

$a'$ is an iron rod, passing through the frame, bracing the rear part of the frame.

The rear part of the frame is held down to the bolster on the rear axle by a rod, $a''$, passing through two (2) pieces of timber $x\ x$, that are fastened to the frame, the rod passing under the hounds of the wagon, to prevent the frame from rising when the box is dumped.

B is the box, which holds the earth; it should be substantially constructed, and strapped with iron to prevent wear.

The box is filled with earth by a scraper, as shown in fig. 2, J representing the scraper.

The horses are driven over the box B until the frame is over the box, the chains C $c$ and the chains C' $c'$ are attached, there being hooks on the chains $c$ and C'.

The chains C C' are permanently attached to the windlasses W $w$, and the chains $c\ c'$ to the box B.

The windlasses are rotated by means of the levers L $l$.

R $r$ are ratchet-wheels on the windlasses W $w$.

E $e$, pawls bolted to the frame A, for the purpose of securing the windlasses from a reverse motion.

The box B is raised up from the ground by means of the windlasses and chains, and swinging inside of the wheels of the wagon.

To dump the earth from the box, lower the front part of the box to the ground, detach the chain C from $c'$, and drive the horses forward.

The chains C' $c'$ still being attached together, the rear part of the box is raised up, and passing under and over the rear part of the frame A, dumping the earth from the box.

Box B' shows the position of the box B after the earth is dumped out, when the box can be hauled back to where the scrapers are, the box being rounded off in front, so as to slide easily over the ground; then detach the box from the frame for filling.

Claims.

I claim as my invention—

1. The combination of the windlasses W $w$, chains C $c$ and C' $c'$, levers L $l$, ratchet-wheels R $r$, and pawls E $e$, substantially as and for the purpose hereinbefore set forth.

2. The box B, with the devices for loading and dumping, substantially as above set forth and described.

WILLIAM D. DORSEY.

Witnesses:
CHARLES P. HOUSUM,
WILLIAM GABLER.